J. WAFER.
SEED-PLANTER.
No. 189,404. Patented April 10, 1877.
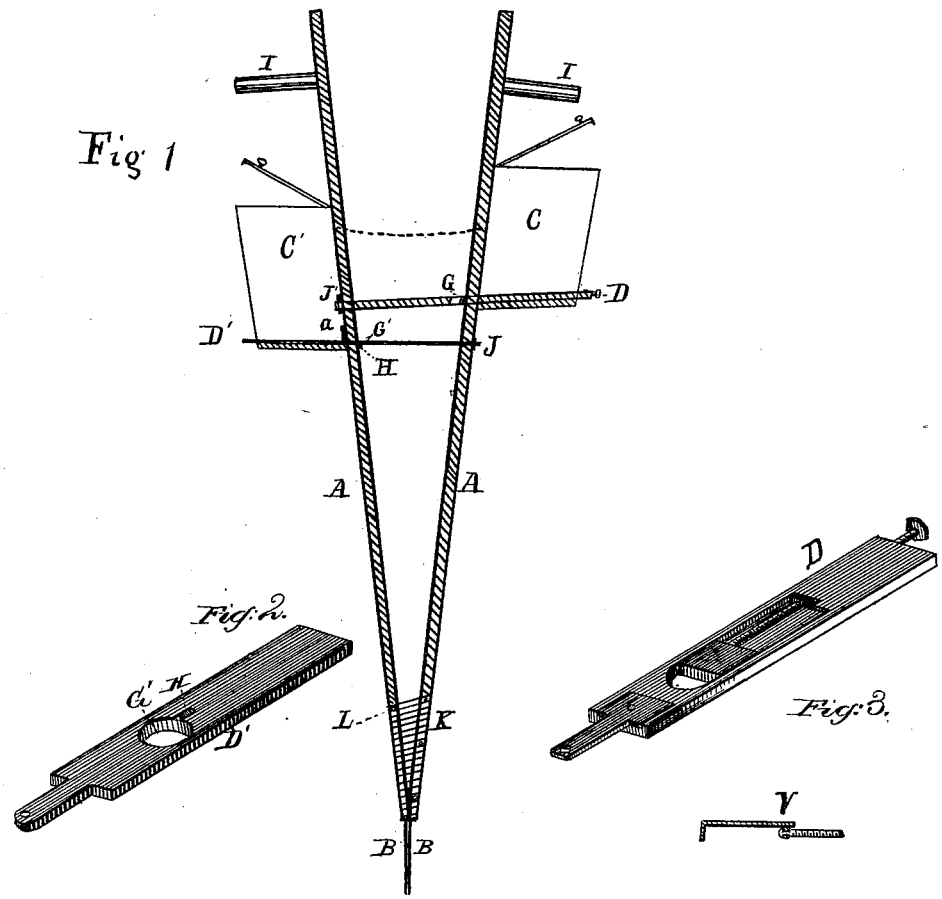

UNITED STATES PATENT OFFICE.

JOHN WAFER, OF ETNA, NEW YORK.

IMPROVEMENT IN SEED-PLANTERS.

Specification forming part of Letters Patent No. 189,404, dated April 10, 1877; application filed March 28, 1877.

*To all whom it may concern:*

Be it known that I, JOHN WAFER, of Etna, in the county of Tompkins and State of New York, have invented certain new and useful Improvements in Corn and Pumpkin-Seed Planter; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is a corn and pumpkin-seed planter which is a substantial improvement over those now in use, and which is so constructed as to overcome the chief difficulty heretofore existing in planting pumpkin-seeds.

The accompanying drawing fully illustrates the nature and character of my invention.

Similar letters indicate the same parts.

Figure 1 is a vertical section of the planter, showing the sides A, the spade-points B, the seed-boxes C C', the seed-slides D and D', the hinge K, the holes G and G' in the slides, and the nib H. Fig. 2 is a view showing the under side of the pumpkin-seed slide D', with its aperture G' and the nib H. Fig. 3 is a view of the corn-slide detached, showing the adjustable gage V, consisting of the movable plate and screw-rod, whereby the operator is enabled to more rapidly and easily adjust the size of the seed-aperture by hand than when a set-screw is used, as in the more ordinary construction.

The seed-boxes are constructed of tin. The one on the right is designed for corn; the one on the left for pumpkin-seeds. The bottom of the boxes is of wood. A groove is provided in each to receive the slides. The slide, D, for corn is constructed of wood, and that for pumpkin-seeds, D', of iron.

The hole G in the first can be adjusted, by means of the plate and screw-rod V, to admit a greater or less amount of corn, as is found desirable. The aperture G' of the pumpkin-seed slide is of sufficient size to admit but one seed at a time, and never more than two, being only as deep as the iron is thick. Directly back of the aperture, and on the under side of the slide, is the nib H, projecting about one-fourth or three-eighths of an inch, a groove in the bottom being provided for its passage. This is necessary, owing to the peculiar wedge shape of the seed, and effectually prevents their getting under the slide and clogging its operation.

The aperture in front of the box is guarded, in the usual manner, by a strip of gutta-percha, felt, or bristles, which, by its yielding nature, will not break or injure the seeds, and will only permit the passage of those in the aperture of the slide. The slides are fastened to the sides at opposite ends, J and J', and have a reciprocating action.

The sides A are constructed of wood, and are about four inches wide and two and one-half feet long. The hinges K are plates at the bottoms of the sides, and fastened rigidly to one, and move on a pivot, L, in the other. The sides are also connected by strong cloth, which forms an inclosure or guide for the seeds.

The spades B are about four inches long and of the same width as the sides A. They are fastened to the inside of the sides at the bottom, so that when closed together they are parallel with each other, instead of at an angle, so that when inserted into the ground they are perpendicular instead of wedge-shaped; and when opened out to release the seed they form a hole whose sides incline toward each other at the top, causing the earth to fall over and cover the seed more readily and effectually than when constructed in the ordinary manner.

The slide D' may be detached at J, and drawn back and secured by a pin provided for that purpose when only corn is to be planted.

I am aware that combined corn and pumpkin-seed planters have been used whose general construction is similar to mine in many respects, and I do not claim the general construction; but

What I claim, and desire to secure by Letters Patent, is—

1. In a combined corn and pumpkin-seed planter, the iron slide D', having the projecting nib H, arranged substantially as described, and for the purpose specified.

2. In a corn and pumpkin-seed planter, arranged with sides A, seed-boxes C C', and slides D D', the nib H, in combination with the grooved bottom, all constructed and arranged substantially as described, and for the purpose set forth.

In testimony that I claim the foregoing as my own I affix my signature in presence of two witnesses.

JOHN WAFER.

Witnesses:
  D. T. WHEELER,
  GEO. B. DAVIS.